G. D. ADAMS.
Ice-Cream Refrigerator.
No. 165,651. Patented July 20, 1875.
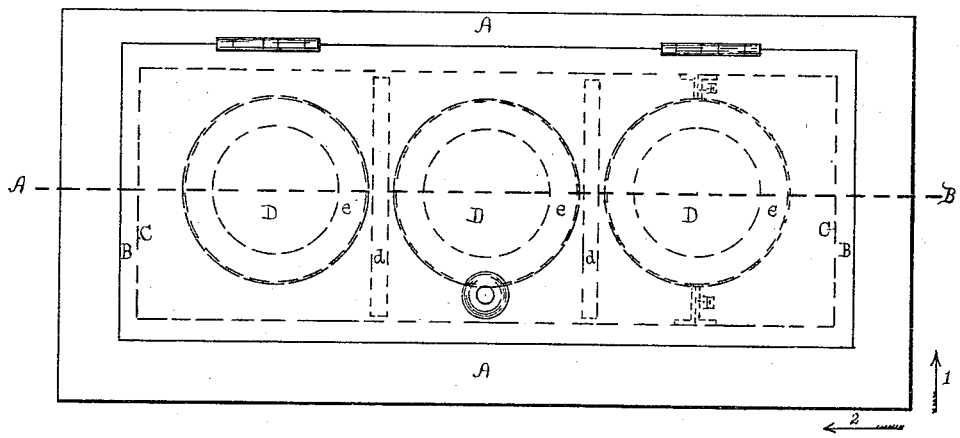
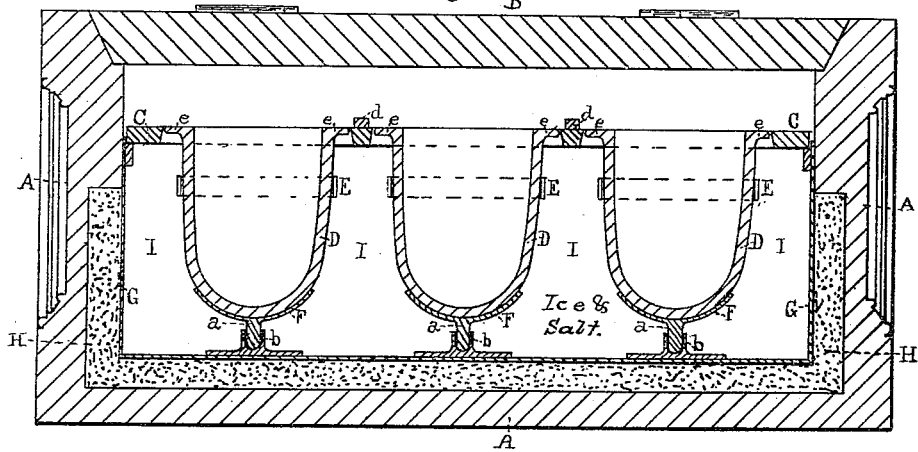
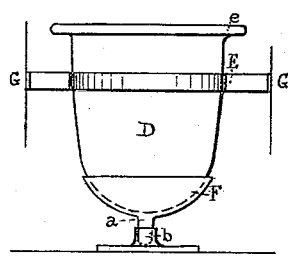
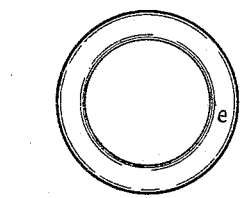
WITNESSES
Edwin E. Moore
Fred L. Goulding
INVENTOR
George D. Adams

UNITED STATES PATENT OFFICE.

GEORGE D. ADAMS, OF WORCESTER, MASSACHUSETTS.

IMPROVEMENT IN ICE-CREAM REFRIGERATORS.

Specification forming part of Letters Patent No. 165,651, dated July 20, 1875; application filed May 31, 1875.

*To all whom it may concern:*

Be it known that I, GEORGE D. ADAMS, of the city and county of Worcester, and Commonwealth of Massachusetts, have invented certain new and useful Improvements in Ice-Cream Refrigerators; and I do hereby declare that the following is a full, clear, and exact description of the same, reference being had to the accompanying drawings, forming a part of this specification, and in which—

Figure 1 represents a top or plan view of the refrigerator. Fig. 2 represents a longitudinal vertical central section on line A B, Fig. 1, looking in the direction of arrow 1. Fig. 3 represents a side view of one of the ice-cream cups and the parts which support it, detached, looking in the direction of arrow 2, Fig. 1; and Fig. 4 represents a top or plan view of one of the cups.

To enable those skilled in the art to which my invention belongs to make and use the same, I will proceed to describe it more in detail.

Great difficulty has heretofore been experienced in preserving or keeping ice-cream for any length of time after being removed from the receptacle in which it was made, and which difficulty led me to devise the improved ice-cream refrigerator herein described, which has been practically tested by me with highly satisfactory results.

A refrigerator-box, A, is made of any desired size, lined with zinc or other non-corrosive material, G, and between the lining G and the box part A a filling of some material which is a non-conductor of heat is employed. A cover, B, is hinged to the top of the box A, and made to fit close when down, as indicated in Figs. 1 and 2. The ice-cream to be preserved or kept is placed in the peculiarly-formed cups D, which are supported near their tops by rings E, supported from the sides of the box, as indicated in dotted and full lines. Cups D have rounded bottoms, which fit and rest in the revolving cups F, whose stems $a$ turn in sockets in the pieces $b$, made fast to the bottom of the refrigerator, as indicated in Figs. 2 and 3. The cups D are provided with flanges $e$ at their upper open ends, and are made, by choice, of the material used in the manufacture of earthenware. The form of the cups D is such that they can be turned easily in the freezing or cooling mixture, which is to be placed around the cups, so as to fully fill the space I. After the space I around the cups D has been filled up to the lower edges, or near the lower edges, of the flanges $e$, a cover, C, (shown in dotted lines in Fig. 1, and in full lines in Fig. 2,) is placed in position so as to close the openings between the flanges of the cups and the sides of the box A, as indicated in full and dotted lines, Figs. 1 and 2. Cover C rests on flanges or projections at each end of the refrigerator, and it is also provided with holes or openings, to allow it to slip over the tops of the cups, as indicated in Fig. 2. Said cover is also provided with cross projections $d\ d$, by means of which it can be lifted on and off readily.

The operation is as follows: The space I is filled with some freezing or cooling mixture, after which the cover C is placed in position, when the ice-cream can be placed in the cups D, where it will be preserved in a fresh and cool condition, and it can be used out, as occasion may require, by simply raising cover B. In case any tendency of the ice-cream to melt is perceived, the attendant has only to give the cups one or two turns in the cooling or freezing mixture, when the cream becomes cooled or frozen again.

It will be noticed that the cups can be easily turned, since they are supported upon stems $a$ and sockets $b$, thereby requiring but little force to revolve them.

The cooling or freezing mixture may be replenished, whenever required, by simply raising cover C, and that, too, without disturbing the cups, which are supported independently of the cover C. An opening is to be provided at the bottom or at one end of the refrigerator-box A, whereby the interior can be readily washed out when desired.

Having described my improvements in ice-cream refrigerators, what I claim therein as new and of my invention, and desire to secure by Letters Patent, is—

1. The combination, with the refrigerator-box A and supporting-rings E, of the revolving cups F, substantially as and for the purposes set forth.

2. The combination, with the socket-piece b, of revolving cup F, having stem a, substantially as and for the purposes set forth.

3. The combination, with rings E and revolving supporting-cups F, of the ice-cream cup D, substantially as and for the purposes set forth.

4. The peculiarly-constructed earthenware ice-cream cup D, provided with a flange, e, upon its upper open end, substantially as and for the purposes set forth.

GEORGE D. ADAMS.

Witnesses:
 EDWIN E. MOORE,
 FRED. L. GOULDING.